US011178601B2

(12) United States Patent
Young

(10) Patent No.: US 11,178,601 B2
(45) Date of Patent: Nov. 16, 2021

(54) GROUP SPEAKERS

(71) Applicant: Erik Young, San Francisco, CA (US)

(72) Inventor: Erik Young, San Francisco, CA (US)

(*) Notice: Subject to any disclaimer, the term of this patent is extended or adjusted under 35 U.S.C. 154(b) by 93 days.

(21) Appl. No.: 16/100,527

(22) Filed: Aug. 10, 2018

(65) Prior Publication Data
US 2018/0352506 A1 Dec. 6, 2018

Related U.S. Application Data

(63) Continuation of application No. 15/620,783, filed on Jun. 12, 2017, now Pat. No. 10,075,908.

(60) Provisional application No. 62/349,222, filed on Jun. 13, 2016.

(51) Int. Cl.
*H04B 7/00* (2006.01)
*H04W 48/18* (2009.01)
*H04R 3/12* (2006.01)
*H04R 5/02* (2006.01)
*H04W 4/80* (2018.01)
*H04B 7/15* (2006.01)
*H04W 12/06* (2021.01)
*H04W 84/12* (2009.01)

(52) U.S. Cl.
CPC .............. *H04W 48/18* (2013.01); *H04R 3/12* (2013.01); *H04B 7/15* (2013.01); *H04R 5/02* (2013.01); *H04R 2420/07* (2013.01); *H04W 4/80* (2018.02); *H04W 12/06* (2013.01); *H04W 84/12* (2013.01)

(58) Field of Classification Search
CPC ....... H04W 4/80; H04W 48/18; H04W 12/06; H04W 84/12; H04R 3/12; H04R 2420/07; H04R 5/02; H04B 7/15
See application file for complete search history.

(56) References Cited

U.S. PATENT DOCUMENTS

| 8,447,801 | B1* | 5/2013 | Roche | H04L 67/306 707/736 |
| 2009/0276674 | A1* | 11/2009 | Wei | H04L 1/16 714/749 |
| 2013/0024901 | A1* | 1/2013 | Sharif-Ahmadi | G06F 17/30017 725/114 |
| 2015/0312519 | A1* | 10/2015 | Cicic | H04N 7/15 348/14.08 |
| 2015/0382050 | A1* | 12/2015 | Le Nerriec | H04L 43/16 725/80 |

(Continued)

Primary Examiner — Nhan T Le
(74) Attorney, Agent, or Firm — Landmark Intellectual Property Law, PLLC; Gregory M Murphy

(57) ABSTRACT

The present invention is generally directed to a playback device configured to audibly output audio in a multi-network environment. The device may include a network interface to receive audio and/or video data over a plurality of wireless networks; speaker drivers; one or more color indicators associated with wireless networks; a user interface to receive a user's selection of a specific wireless network through a the use of a color indicator; and one or more processors to sign into a selected first wireless network and receive data therefrom, and to audibly output the data received; receive from the user interface a selection of a specific color, the specific color associated with a second wireless network; sign out of the specific wireless network and into the second wireless network; and receive from the second wireless network data, and output the audio via the one or more speaker drivers.

9 Claims, 14 Drawing Sheets

(56) References Cited

U.S. PATENT DOCUMENTS

2016/0006778 A1* 1/2016 Beckhardt ........ H04N 21/42684
370/328

* cited by examiner

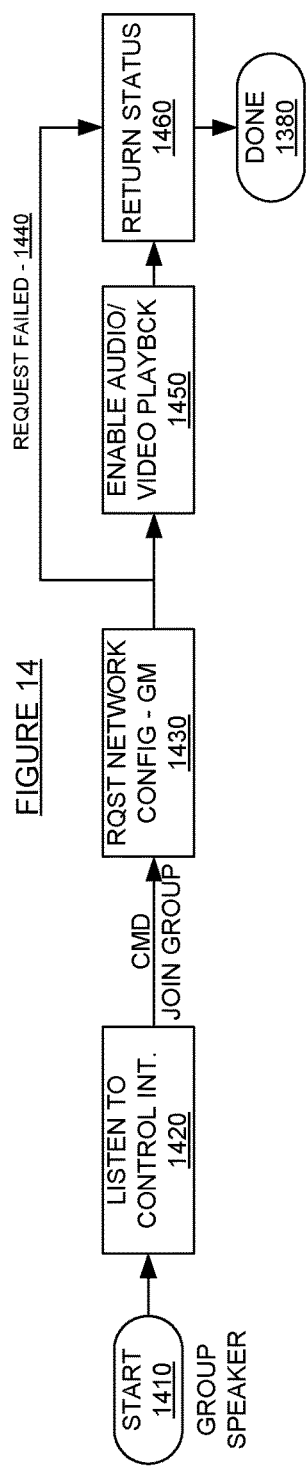

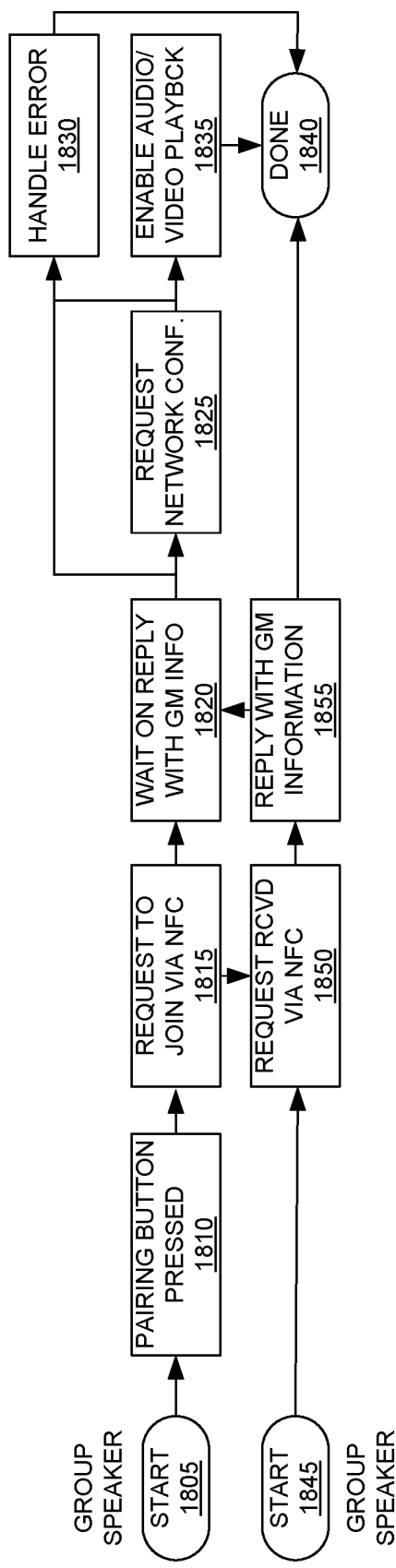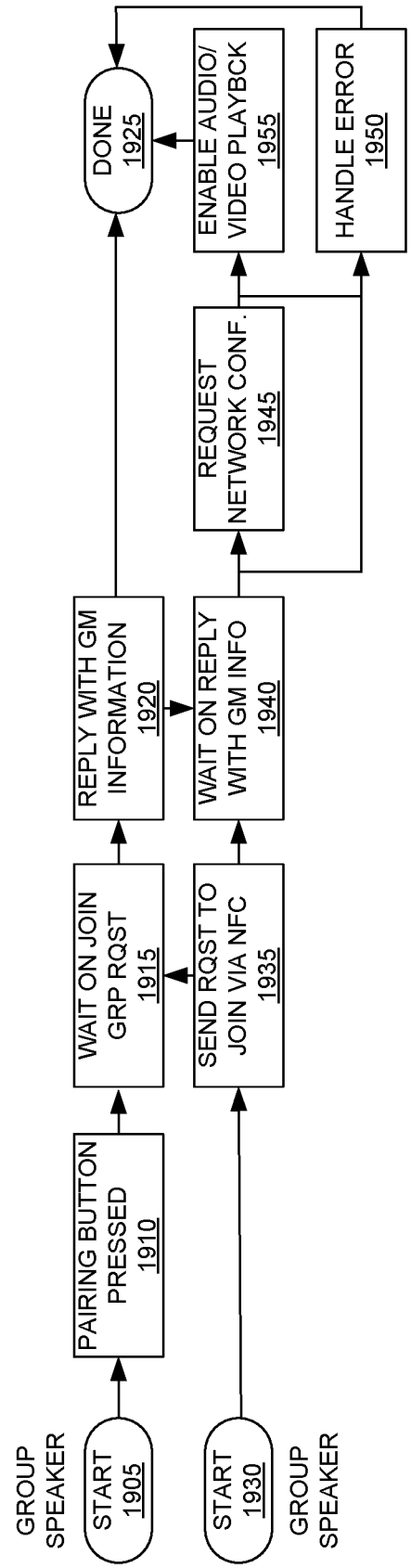

COMMAND PAIRING MODE

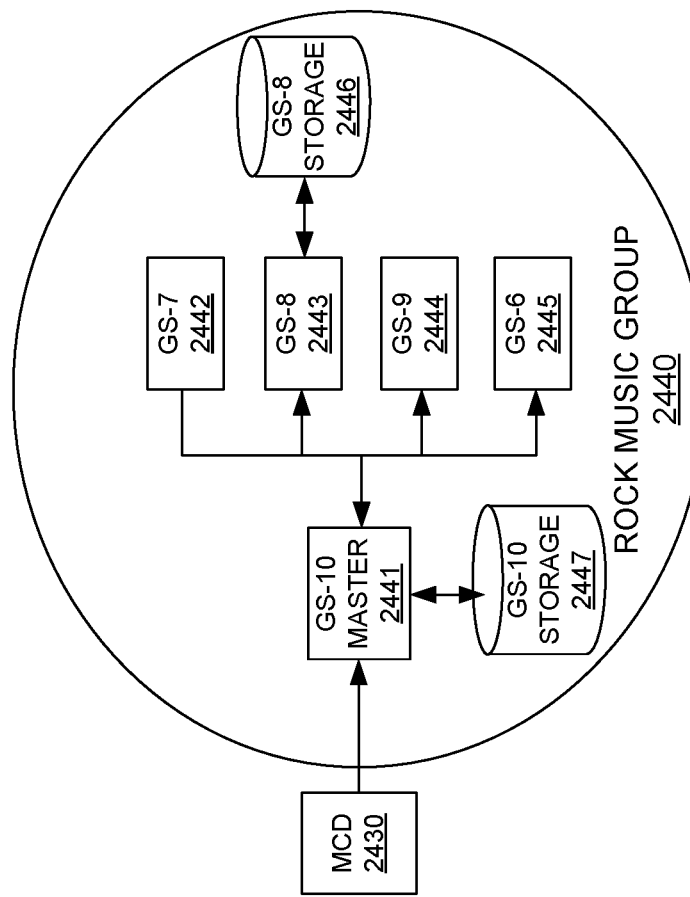
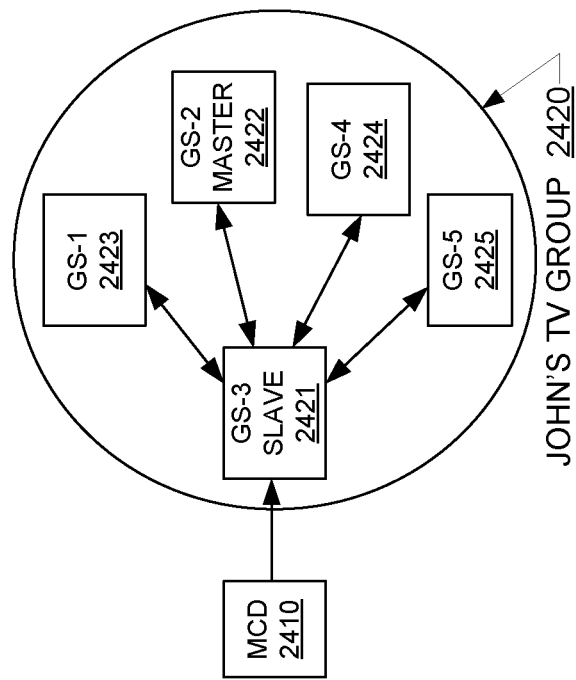
FIGURE 24

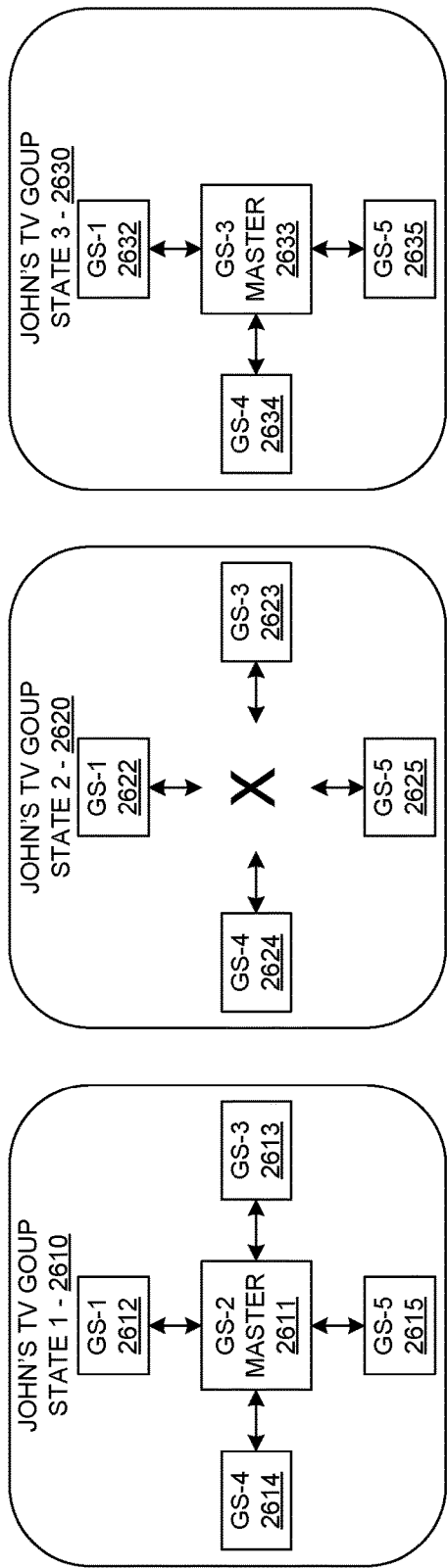
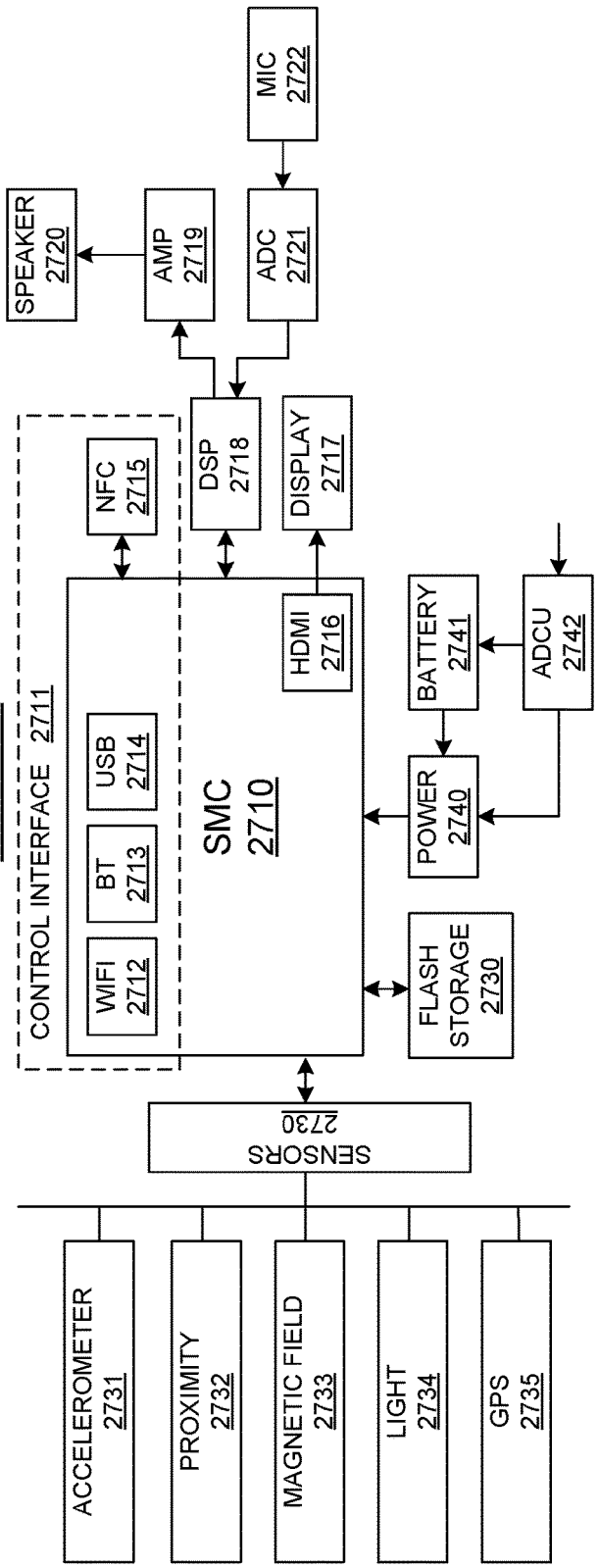

GROUP SPEAKERS

RELATED APPLICATIONS

This application is a divisional application from U.S. patent application Ser. No. 15/620,783, filed on 12 Jun. 2017, which in turn claims priority to U.S. Provisional Patent Application No. 62/349,222, filed on 13 Jun. 2016, each of which is incorporated by reference herein in its entirety.

BACKGROUND

Speaker technology has advanced over the last 100 years, however the speaker system x control model (i.e. architecture) has remained generally the same. Such models generally remain based on a premise that one device controls all speakers, something referred to herein as the Central Control Model. As a result, current speaker systems may be complex, limited and require expensive solutions when new capabilities are invented and needed by end users. It is therefore desirable to reduce complexity, remove external wireless network dependencies, remove connectivity limitations, and reduce speaker system setup time.

A drawback of the Central Control Model may stem from the fact that it has a single point of entry. This single point of entry may create limitations, overcoming which may require complex customization at a high cost. High costs may in turn deter customers. In addition, the Central Control Model is generally inflexible and when a new technology emerges, a customer often has to replace his or her whole system to get the advantages of the new technology. Accordingly, a new type of wireless speaker that expands the capabilities of Bluetooth and/or Wi-Fi speakers is desirable.

SUMMARY OF THE INVENTION

Aspects in accordance with some embodiments of the present invention may include a playback device configured to audibly output audio in a multi-network environment, the device comprising a network interface to receive audio data over a plurality of wireless networks; one or more speaker drivers to audibly output the audio received; one or more color indicators associated specific wireless networks; a user interface, the user interface configured to receive a user input to select a specific wireless network through a user selection of a specific color indicator; and one or more processors, configured to: sign into a selected first specific wireless network and receive audio data therefrom, and to audibly output the audio data received via the one or more speaker drivers; receive from the user interface a selection of a specific color, the specific color associated with a second specific wireless network; sign out of the first specific wireless network and into the second specific wireless network; and receive from the second specific wireless network audio data, and output the audio data via the one or more speaker drivers.

Aspects in accordance with some embodiments of the present invention may include a network for broadcasting and sharing wireless data, the network comprising a plurality of wireless playback devices, each acting as an individual node in a specific wireless network, each wireless playback device configured to: access the specific wireless network; and audibly output audio and/or video data received over the specific wireless network; wherein each wireless playback device enables communication between devices on the specific wireless network, such that the source of the audio and/or video data may be any of the devices on the specific wireless network.

Aspects in accordance with some embodiments of the present invention may include a playback device configured to audibly output audio and/or video data received from a wireless network in a multi-network environment, the playback device acting as an individual node on the wireless network and being configured to broadcast the audio and/or video data audibly output, or to act as a repeater and broadcast the audio and/or video data received from the wireless network, the device comprising: a network interface to receive audio data over a plurality of wireless networks; one or more speaker drivers to audibly output the audio received; a user interface, the user interface configured to receive a user input to select the wireless network; and one or more processors, configured to: sign into a selected first wireless network and receive audio data therefrom, and to audibly output the audio data received via the one or more speaker drivers, wherein the playback device has the proper credentials and authorization to sign into the first wireless network without any additional user input; receive from the user interface a selection of a second wireless network; sign out of the first wireless network and into the second wireless network, wherein the playback device has the proper credentials and authorization to sign into the second wireless network without any additional user input; and receive from the second wireless network audio data, and output the audio data via the one or more speaker drivers.

These and other aspects will become apparent from the following description of the invention taken in conjunction with the following drawings, although variations and modifications may be effected without departing from the spirit and scope of the novel concepts of the invention.

DESCRIPTION OF THE FIGURES

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 14 illustrates an exemplary GS group pairing flow, in accordance with some embodiments of the present invention.

FIG. 15 illustrates exemplary MCD to MCD pairing, in accordance with some embodiments of the present invention.

FIG. 18 illustrates an exemplary flow for requested pairing, in accordance with some embodiments of the present invention.

FIG. 19 illustrates an exemplary flow for host pairing, in accordance with some embodiments of the present invention.

FIG. 24 illustrates an exemplary media streaming push versus pull, in accordance with some embodiments of the present invention.

FIG. 26 illustrates an exemplary ACR process, in accordance with some embodiments of the present invention.

FIG. 27 illustrates an exemplary speaker management controller, in accordance with some embodiments of the present invention.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular. Unless otherwise indicated, the terms used in this document should be read in accordance with common usage.

In accordance with the present invention, this may be referred to as a Distributed Control Model (DCM). In short, a DCM may take control away from one centralized device and redistributes control to the speakers themselves. Accordingly, any device may connect to any speaker and data and or commands are forwarded to any or all speakers belonging to the speaker system network.

Group speakers are the result of these control model architectural changes. Each group speaker may build its own wireless network and may include the capability to autonomously join any other speaker network. Group speakers may autonomously setup fully functional multi-speaker wireless audio networks quickly, reducing setup time. Moreover, audio zoning may be greatly simplified because group speakers may autonomously leave for example Zone A (i.e. network A, group color—Green) to join Zone B (i.e. network B, group color—Blue) by changing the group color of the speaker itself. Put another way, a user can now rezone a speaker belonging to network A—Green, by changing its LED/group color from green to blue. The speaker may automatically find and join the blue network, (Network B). In addition, group speakers may function as wireless repeaters, effectively expanding wireless network coverage area of not only the speaker network, but optionally external wireless networks.

Notably, a group or zone of speakers identified by color may be a network all to itself, or may be a subset of speakers on an existing network (but still associated with a specific color). In other words, speakers may have the ability to find and change groups/zones by color, regardless of whether that color group was on the same network or a different wireless network altogether.

Figure 3:
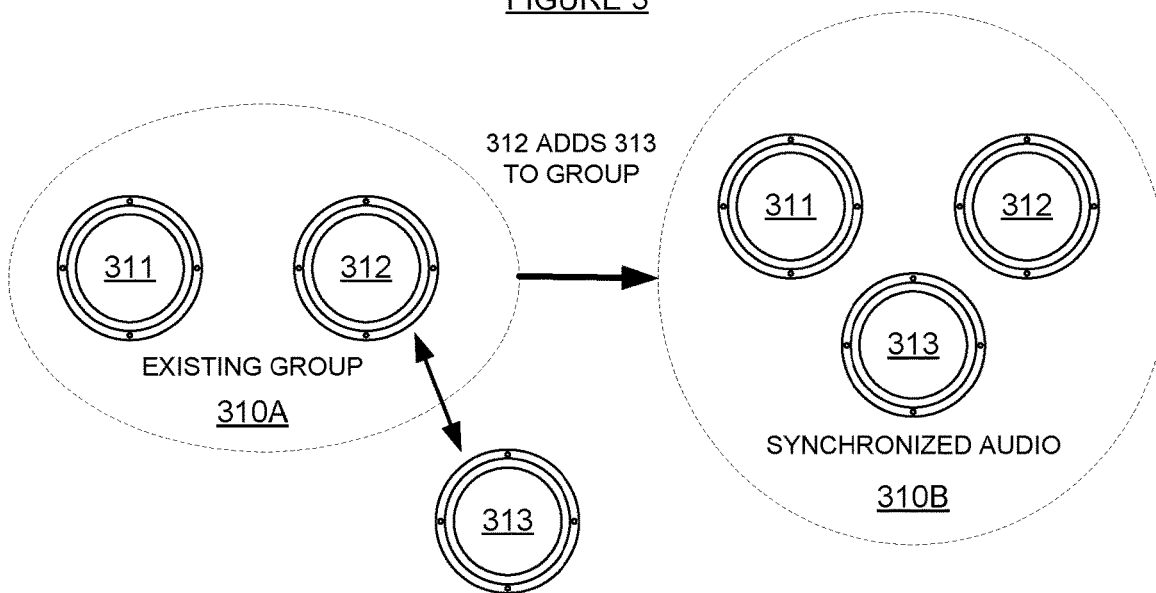
FIG. 3 illustrates GS (HW) group pairing, in accordance with some embodiments of the present invention.

In general, Group Speakers utilize a model that incorporates multiple points of entry, and independent wireless mesh networks, called the Distributed Control Model. FIG. 3 illustrates three aspects of the Distributed Control Model, which are 1-Isolate, 2-Distribute and 3-Forward. Each speaker in the Distributed Control Model may possess the ability to build an independent wireless network (i.e. isolate). In addition, each speaker may function as an entry point for external devices to send data streams and control messages (i.e. distribute). Also, each speaker may have the ability to forward such data streams and control messages to any node or speaker within the wireless network. In other words, the Distributed Control Model may distribute control to all devices capable of connecting to a speaker, and these speakers may forward data streams and commands to other speakers or external devices connected to the wireless network.

As a result, the overall system complexity may be reduced because the control device may no longer be responsible for providing any new capabilities. Rather, new capabilities may be provided by the speakers themselves. Complexity may be further reduced because no external wireless routers and repeaters may be required for the speaker systems to function. As a result, speakers systems using the Distributed Control Model may have more capabilities while costing less, due to a reduction in complexity, limitations and equipment.

The present invention is generally directed to what is termed "Group Speakers" or "GS." Group Speakers were designed to address the problems associated speakers operated with the central control model, as discussed above (including but not limited to Bluetooth and/or Wi-Fi based speakers). In general, Group Speakers may be a network of wireless speakers that connect to each other, synchronizing audio across each speaker. Audio streaming and/or selection may not be limited to one master control device (MCD), but instead multiple MCDs and/or any connected device may be capable of connecting to and playing and/or streaming audio on the entire group of wireless speakers. This functionality may create or add a social dynamic currently unavailable by providing users with the ability to combine speakers into a single group and easily change the streaming source. A master control device may be any device that can connect to and control a group speaker via its command interface. For example, a mobile phone or computer (e.g., personal computer, laptop, tablet, etc.) may be a MCD (and, as an example, a phone or computer may be running an app that interfaces with the devices/networks). Audio streams and control commands may be forwarded from the group speaker to which the MCD is connected to any group speaker or device belonging to the wireless network.

Figure 1:
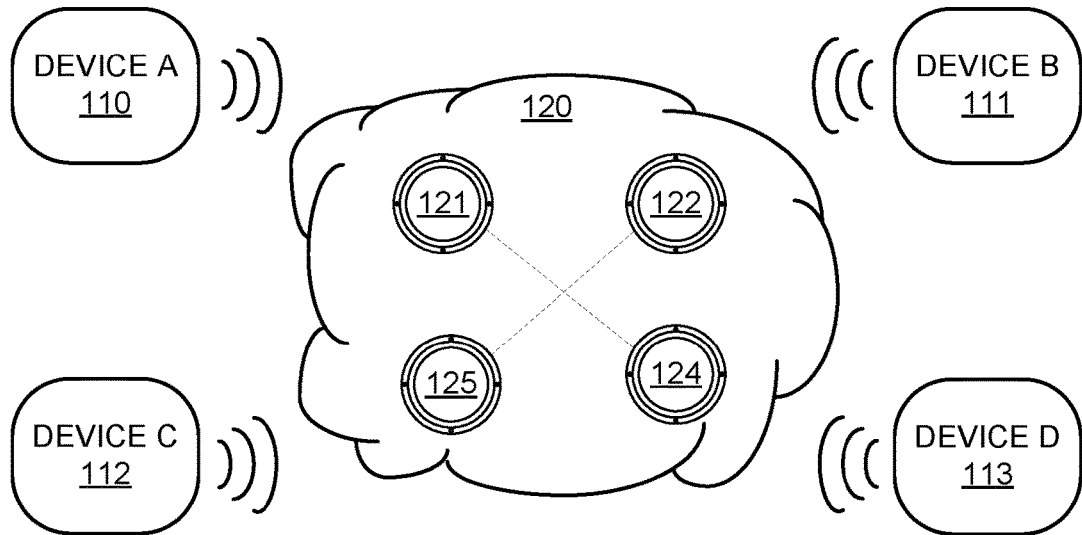
FIG. 1 illustrates MCD (SW) group pairing, in accordance with some embodiments of the present invention.
Figure 2:
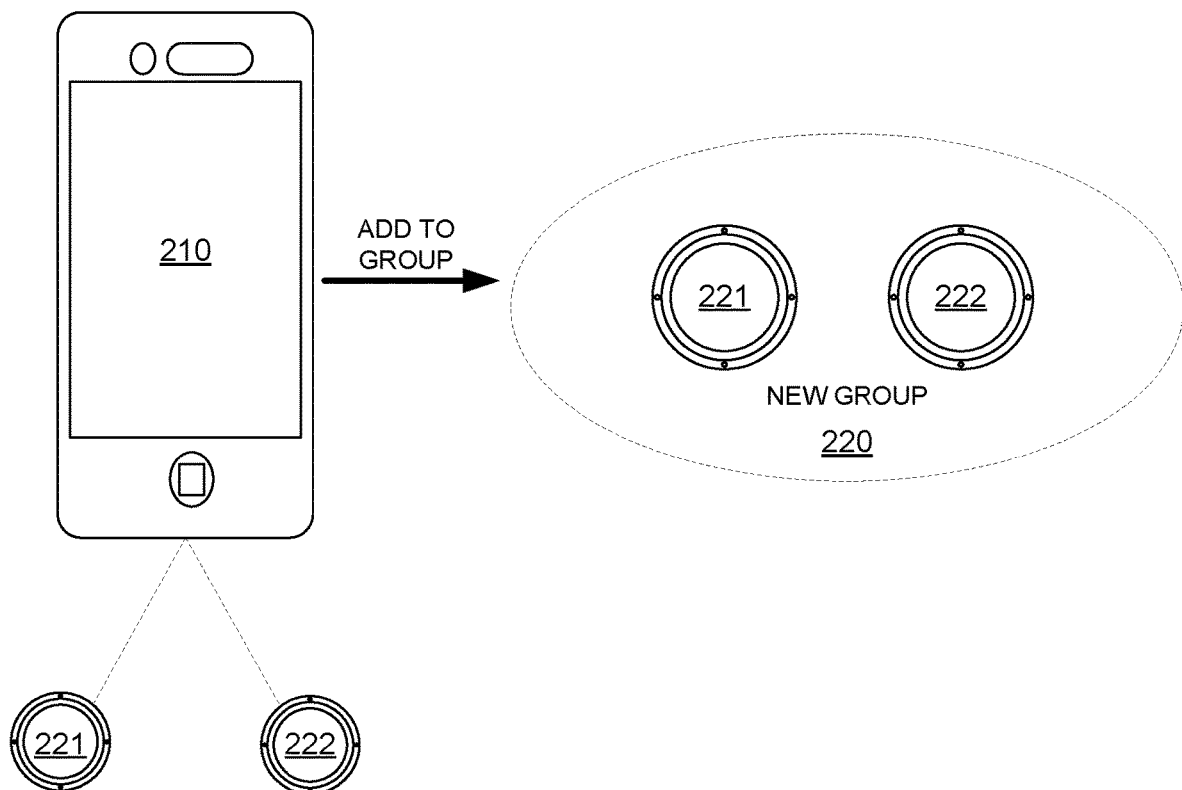
FIG. 2 illustrates MCD (SW) group pairing, in accordance with some embodiments of the present invention.

In the simplest example, one MCD may be connected to at least one Group Speaker. A user may then add an additional GS to the group via software on the MCD or hardware on the speakers themselves. A user of the present invention may, for example, add additional group speakers to the group via a master control application (MCA) operating on the master control device (MCD), or via a group speaker application (GSA) or "app" that may be running on the hardware of the speakers themselves. The addition of a Group Speaker to a group is termed "group pairing." As shown in FIGS. 1-3 a user with sufficient access permissions to Group Speaker A and B, may associate GS A and B with a user defined group. Group associations may be persistent and if so, persistent associations may be changed via the MCA or GSA app or software running on the MCD or speakers themselves, respectively.

In FIG. 1, multiple control devices ("Device A" 110, "Device B" 111, "Device C" 112, "Device D" 113) may each have access to an independent wireless network 120 comprising one or more speakers (121, 122, 123, 124). Control may be distributed to each of the devices 110, 111, 112, 113, and each speaker 121, 122, 123, 124 may forward the audio stream from a control device to any other speaker 121, 122, 123, 124 or group of speakers. Note that control devices may include wireless mobile phones, computers, laptops, tablets, and even appliances (such as microwaves, stoves, ovens, refrigerators dishwashers, etc.), thermostats, sensors, etc.

With reference to FIG. 2, a control device may be, for example, a mobile telephone 210. Note that in this documents, control devices are often referred to as or illustrated as mobile phones. However, a control device may be a computer, laptop, tablet, storage device (such as a thumb drive), or any other type of electronic device capable of playing and wirelessly transmitting either stored or streamed audio. Control device 210 may be added to a group 220, which may include speakers 221, 222. Once the control device is added to the group 220, the control device may be added to a group or connected to a speaker belonging to the group. Once the control device is added to the group or connected to a speaker belonging to the group, the control device may provide the audio feed to the speakers, shown connected as 211, 212. In other words, if the control device is, for example, Wi-Fi-capable, then the control device may be added to the wireless network (i.e. Wi-Fi network) and hi-definition audio may be transported. In addition, a control device may also wirelessly connect (for example, via Bluetooth or Wi-Fi Direct) to a nearby speaker that does not belong to the group, yet stream music to the entire group from such source, since the connected speaker may forward the audio to the group.

With reference to FIG. 3, an existing group 310A may comprise speakers 311, 312. Speaker 313 may be wirelessly accessible, but may not be part of group 310A. However, in accordance with some embodiments of the present invention, speaker 313 may—through speaker 312—join the group. Accordingly, group 310B may now comprise speakers 311, 312, and 313. In this manner, through the speakers a wireless mesh network may be created.

Figure 4:
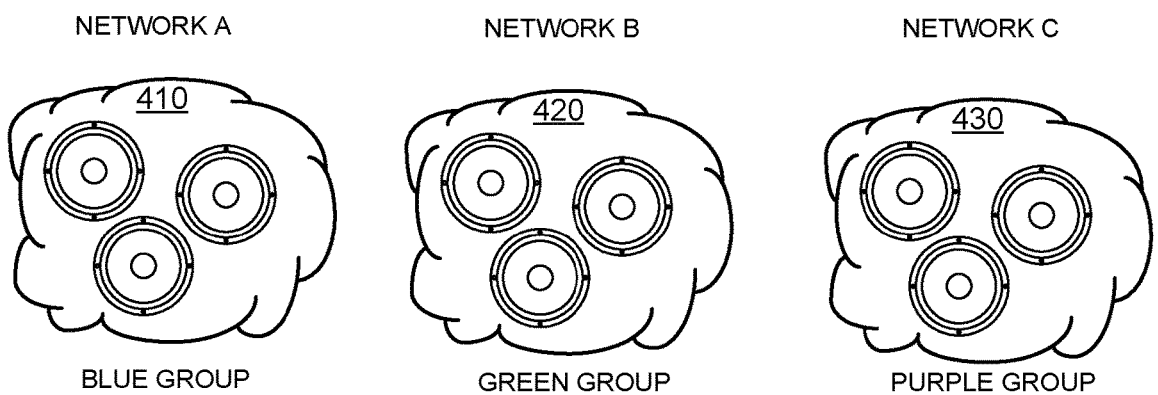
FIG. 4 illustrates MCD (SW) group pairing utilizing color, in accordance with some embodiments of the present invention.
Figure 5:
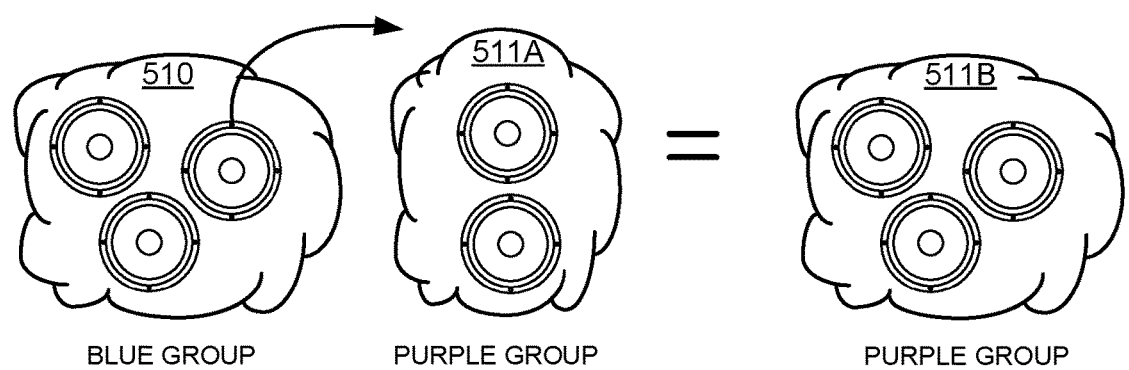
FIG. 5 illustrates GS (HW) group pairing utilizing color, in accordance with some embodiments of the present invention.

Groups may be independent wireless networks and may not only be associated with any underlying wireless technology identifiers like SSID or BSSID, but also color as shown in FIGS. 4 and 5. In order to associate a GS with a group via hardware, a user may initiate group pairing by first toggling a switch on either the speaker that is joining the group or a speaker that is already a part of the group. Next, the speaker joining the group may be placed in wireless range to the speaker belonging to the group, and long enough for the group information to be transferred from one device to the other. Close proximity may be any distance sufficient for the new speaker to be identified with a high degree of confidence. According to some embodiments of the present invention, such proximity may be quite close (for example, less than twelve (12) inches, or even less than four (4) inches), while according to other embodiments speakers may be identified at greater distances. After the GS joins the group, audio may automatically be synchronized across each speaker.

With reference to FIG. 4, a control device may be able to access multiple groups, or networks. Each group or network may be indicated by a color. Such color may be present on the speaker itself, for example through the use of a light emitting diode (LED). A speaker joining the group(s) may select the group to join by matching the LED color on the speaker with the desired group. In FIG. 4, Network A, 410 may be indicated by blue. Network B, 411 may be indicated by green. Network C, 412 may be indicated by purple.

When a user changes the network on the speaker—for example by toggling the LED to the desired color, a speaker may sign out of its current group (its current network) and join the desired group (and desired network). In FIG. 5 this is illustrated by speaker 521 leaving group 510 and joining group 511, resulting in group 511A—now including speaker 521.

In accordance with some embodiments of the present invention, any speaker may be capable of functioning as a group master (GM). A group master may function as a wireless access point as well as a centralized network access and configuration manager for the group slaves. This may alleviate the need for Group Speakers to connect to a wireless router in order to transmit and receive data.

Figure 6:
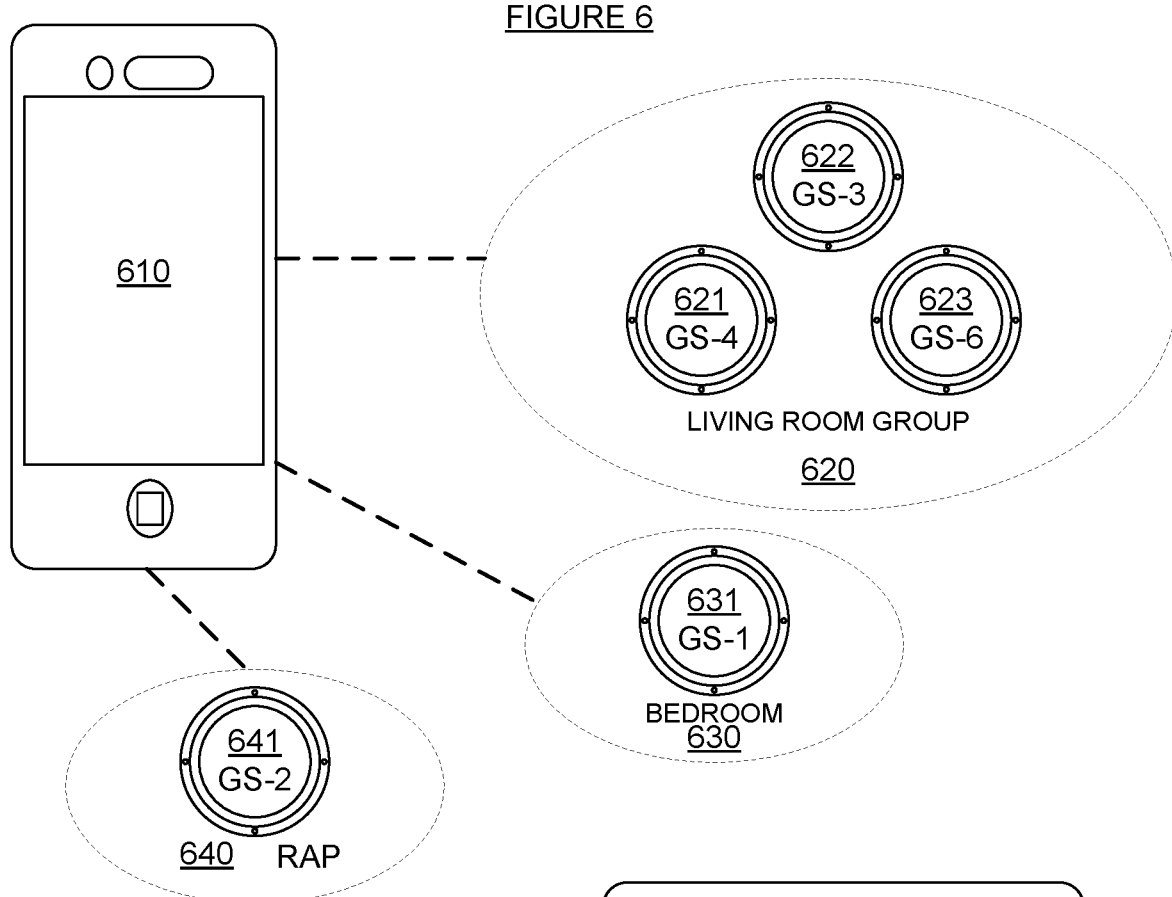
FIG. 6 illustrates exemplary group associations, in accordance with some embodiments of the present invention.
Figure 7:
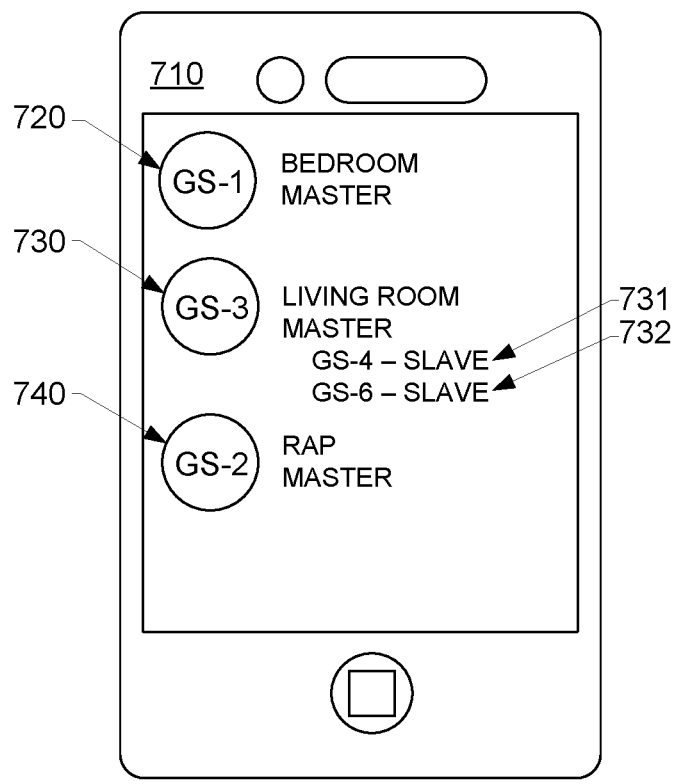
FIG. 7 illustrates an exemplary group list, in accordance with some embodiments of the present invention.

An exemplary association(s) between master control devices, group masters and groups slaves is illustrated in FIGS. 6 and 7. With reference to FIG. 6 a control device 610 may have access to three (3) different groups, 620, 630, and 640. Each group may have a different audio feed, and may be associated with a different zone. For example, group 620 may comprise speakers 621, 622, and 623, all playing music in the living room. Group 630 may comprise a speaker 631 playing in a bedroom. Group 640 may not be tied to a zone, but may comprise a speaker 641 with a certain audio feed, for example, playing rap music.

If a group speaker is not associated with a group then it may automatically switch to group master mode forming a group with a single node, itself. This is illustrated by group speaker GS-1 and GS-2. When a group speaker functions as group master it may become a wireless access point (i.e. broadcast their SSID) and thus the network may be visible to MCD's. However, other interfaces (such as but not limited to Bluetooth and/or Wi-Fi direct interfaces of speakers in the group may be visible. The speakers may communicate and send data via a wireless Wi-Fi network the group master builds (i.e. internal communication), however such speakers may also support external connections to the MCD's wirelessly, via for example Bluetooth or Wi-Fi direct or any other wireless technology. Groups may also support user configurable names. For example, notice group master GS-3's group name is 'Living Room", group master GS-2 is 'Rap' and group master GS-1 is 'Bedroom 1'. Group speakers GS-4 and GS-6 belong to the Living Room group and are slaves of group master GS-3. Groups may be comprised of one or more Group Speakers, and zero or more master control devices.

FIG. 7 illustrates the group associations from the MCD 710 vantage point. MCD 710 and GS may have the ability to see groups, group slaves, and/or an MCD associated with a particular group. This may be possible by using metadata that may be returned from the group master(s). In this example GS-1 720 and GS-2 740 only returned metadata about themselves because no group slaves are present. However GS-3 730 returned metadata about itself, GS-4 731 and GS-6 732.

Public Versus Private Groups.

In order to alleviate problems related to Bluetooth pairing, Bluetooth shared pairing, and Bluetooth range, Group Speakers may utilize Wi-Fi as the primary data transport method. Wi-Fi has gained widespread adoption, has superior range, and is highly configurable. However security of Wi-Fi transmissions may be a concern. As a result, Group Speakers may operate in two different group modes: Public or Private.

Public mode is the least secure and it may allow any GS or MCD in the wireless range to join the group without any type of authentication (or with very limited authentication). However, guest GS's or guest MCD's do not have administrator privileges over the group and therefore cannot change the group settings. Devices that gain access to the group via permission based authentication are considered guest and may not be allowed to alter group settings.

Private mode requires either physical authentication, permission based authentication, or both. Devices that are physically authenticated may be trusted devices that can gain administrative privileges and change group settings. Group speakers may allow multiple trusted devices to be associated with a group at one time. Groups in private mode may also allow multiple guests to be associated with a group at one time.

Figure 8:
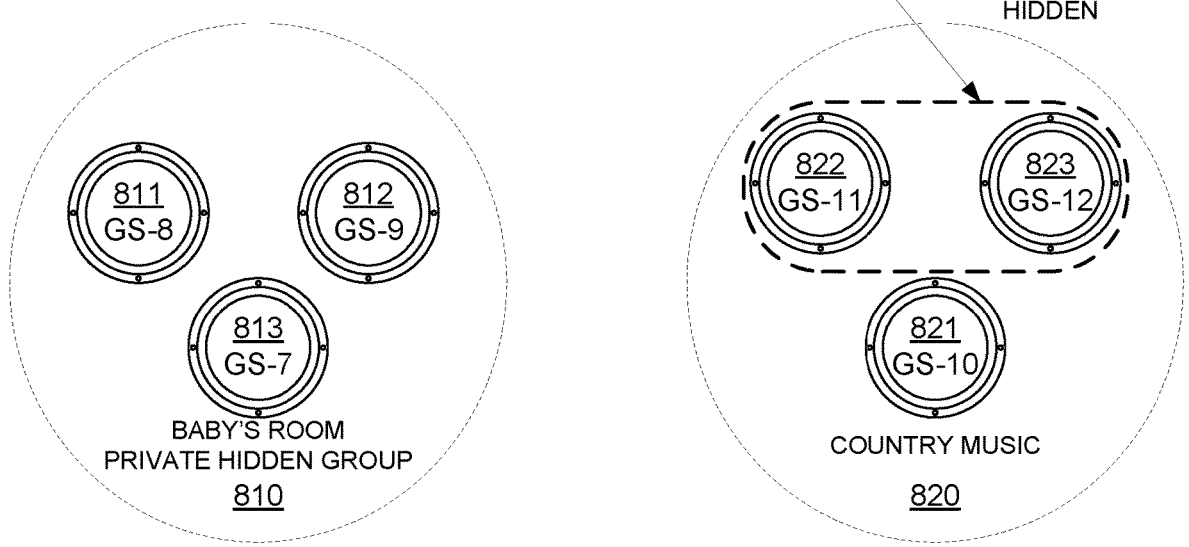
FIG. 8 illustrates exemplary privacy settings, in accordance with some embodiments of the present invention.
Figure 9:
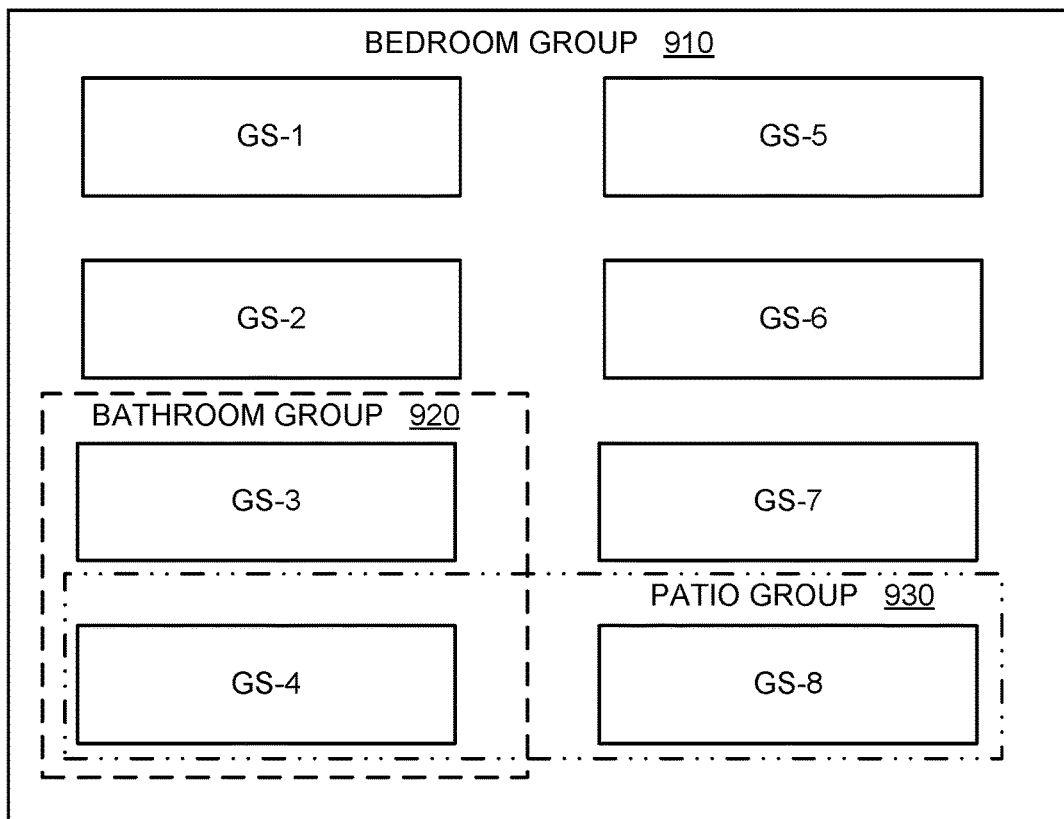
FIG. 9 illustrates exemplary subgroups, in accordance with some embodiments of the present invention.

FIG. 8 highlights some exemplary aspects of private group settings related to privacy. Private groups may be completely hidden as illustrated by the GS-7 810 'Babies Room' group. This group may comprise multiple speakers 811, 812, 813, but each speaker and the overall group may be hidden. In accordance with some embodiments of the present invention, a group may be seen, but the individual group members may be hidden. This setting is illustrated by the GS-10 820 'Country Music' group. This group 820 comprises three speakers 821, 822, 823. However, to only speaker 821 (the master) may be discoverable by other speakers. In other words, in accordance with some embodiments of the present invention a user may be able to prevent their speaker device from being accessed as either a master, or to perpetuate a mesh network.

In addition private groups may be configured to ignore all request from non-trusted devices. Table 1 below indicates some features of Public Groups vs. Private Groups.

TABLE 1

| Public Group | Private Group |
| --- | --- |
| No authentication required | Physical or permission based authentication may be required |
| Accepts all or most connection requests | Connection requests approved or denied by trusted devices |
| Guests cannot alter group settings | Guests cannot alter group settings |
| | Group or constituent Group Speakers may be hidden. |

Subgroups.

Groups may be further divided into subgroups. In general, subgroups may not be mutually exclusive, and as a result a Group Speaker may receive a media stream on the main and several subgroup connections simultaneously. Subgroup connections may be established with the same main group IP address but on a different port. For example, 9 illustrates two subgroups 920, 930, existing within the main 'Bedroom' group 910. The 'Bathroom' subgroup 920 contains two Group Speakers GS-3 and GS-4 where communication is conducted on port 9001. The 'Patio' subgroup 930 contains two group speakers GS-4 and GS-8, operating using port 9002. The Bedroom group 910 may be using a default port. Subgroups may provide flexibility and allow for very interesting use cases. To illustrate, a music band that utilize several electric guitars (MCD's) may connect them to subgroups, thereby sending their output to specific speakers only. Simply creating a 'right speakers' subgroup would allow a guitar's output to be transmitted only to the speakers on the right side of the venue during a live concert.

Group Pairing.

Group pairing occurs when a MCD or GS adds a group speaker to a group. A user may initiate group pairing via software on the MCD or via hardware on the Group Speaker. Aspects of group pairing design and program flow are discussed below.

MCD to GS Initiated Group Pairing.

Figure 10:
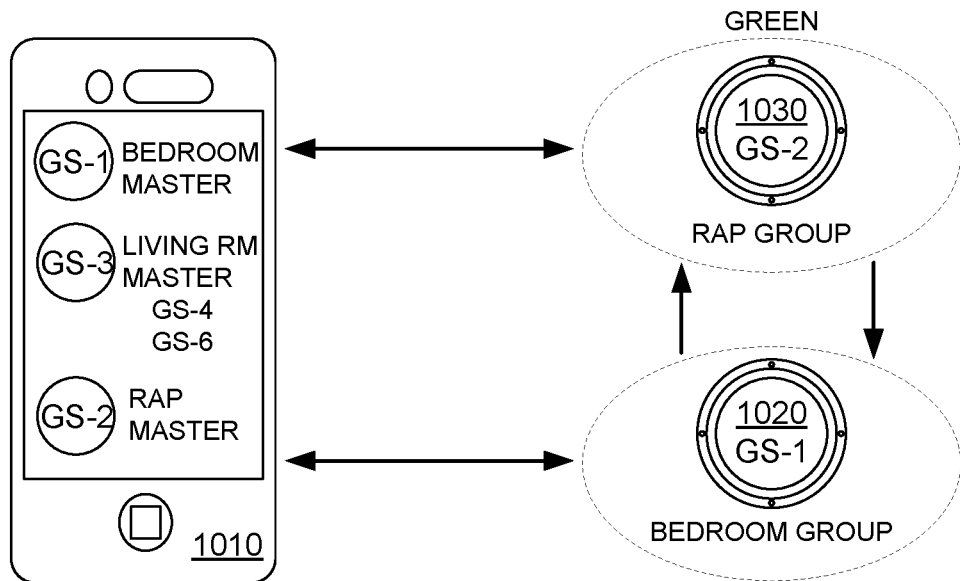
FIG. 10 illustrates exemplary MCD to GS pairing, in accordance with some embodiments of the present invention.

With reference to FIG. 10, a master control device may initiate group pairing by sending pairing commands to the group speakers directly, or it may initiate group pairing indirectly via another MCD. In order to initiate group pairing via a group speaker directly, the MCD should be a trusted device. (Note that in some embodiments of the present invention, the MCD may not be a full "trusted device," but may be permitted to initiate pairing nonetheless.) When the MCD is a trusted device, an additional layer of security may be present by ensuring that a GS will only execute commands coming from a remote device (i.e. device on the network) with sufficient permissions. If the MCD 1010 in FIG. 10 has sufficient access permissions to Group Speakers GS-1 1020 and GS-2, then control device 1010 may associate GS-1 1020 and GS-2 1030 with a group. In other words, it has the option to connect speaker GS-1 to the 'Rap' group GS-2 belongs to or speaker GS-2 to the 'Bedroom' group GS-1 belongs to. Note that in accordance with some embodiments of the present invention, these two groups may be entirely different wireless networks.

Figure 11:
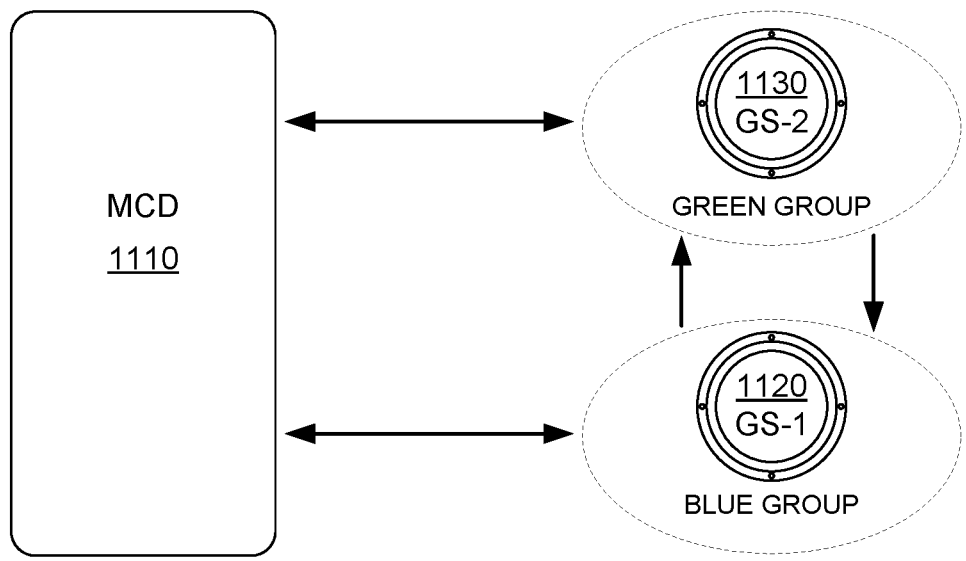
FIG. 11 illustrates exemplary MCD to GS pairing, in accordance with some embodiments of the present invention.

In addition, as illustrated in FIG. 11 this again may be indicated by color. The bedroom group 1120 may be indicated by a blue LED, while the rap group 1130 may be indicated by a green LED. Different devices joining the group(s) may utilize matching LEDs to instruct devices and other GS's to join the desired group.

Note that the pairing may occur two different ways. First, the MCD may send a pairing command to GS-1 via connection 1. GS-1 may then forward the request to GS-2 via connection 2. If the request passes the permissions check, then GS-2 may reply to GS-1 with the network configuration via connection 2. GS-1 may join the 'Bedroom' group by accepting its new network configuration and returning the command results to the MCD 1010 via connection 1.

Exemplary flow charts describing such methods of group pairing are pictured in FIGS. 12, 13, and/or 14 below. The underlying behavior may be the same when utilizing group colors, however the user may simply associate GS-1 with GS-2 by changing the corresponding color of GS-1 from blue to green. At that point, GS-1 may autonomously join the green "rap" group. Second, the MCD may send a pairing command to GS-2 via connection 3. GS-2 may reply to the MCD via connection 3 with the network configuration for GS-1. MCD may forward the network configuration to GS-1. GS-1 may join the 'Rap' Group by accepting its new network configuration.

Figure 12:
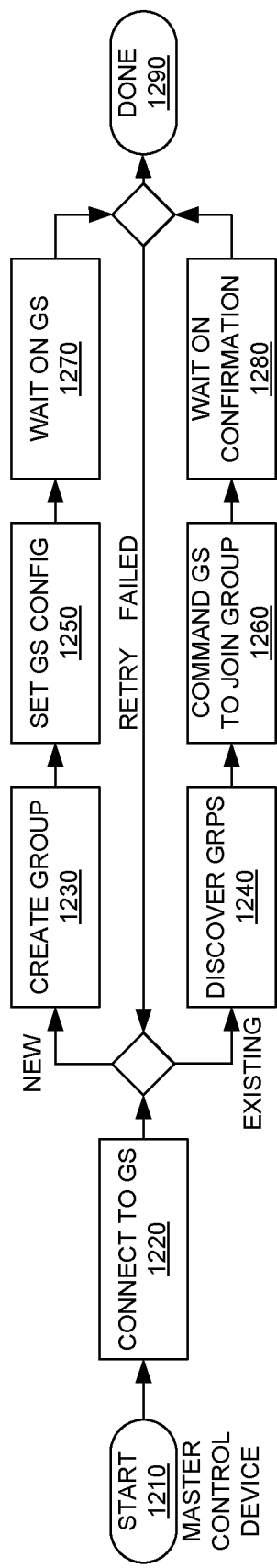
FIG. 12 illustrates an exemplary MCD group pairing flow, in accordance with some embodiments of the present invention.
Figure 13:
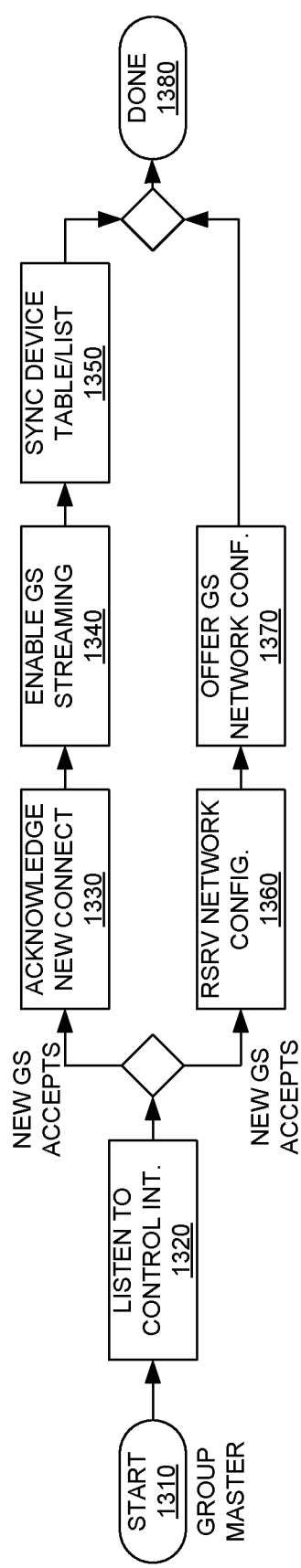
FIG. 13 illustrates an exemplary GM group pairing flow, in accordance with some embodiments of the present invention.

Note that FIG. 12 illustrates the MCD's algorithm in relation to the group pairing example shown in preceding FIG. 10. As illustrated, the process may start at 1210, after which the MCD may first connects to GS-1 at 1220. The MCD may then discovers groups within its wireless in range at 1240. The MCD may send a command to GS-1 to join the 'Rap' group GS-2 belongs to at 1260. At 1280 the MCD may wait on GS-1 to negotiate its network configuration with GS-2 and reply with the result. Alternatively, the MCD may create a new group at 1230, and set the GS network configuration at 1250. At 1270 the MCD may wait on confirmation of the group speaker (much as in 1280), and at 1290 the process may end with the MCD connected to the desired group.

With reference to FIG. 12, an exemplary algorithm of the GM in relation to the group pairing is illustrated. Note that this algorithm may be performed by the Master Control Application (MCA) operating on the master control device (MCD). As shown, the process may start at 1310. At 1320 GS-2 may listen for commands on all of its interfaces (wired and wireless). After receiving a join request from GS-1 at it may reserves an IP address at 1360 and reply with an offer at 1370. If GS-1 accepts the offer then GS-2 may again reply, but this time with an acknowledgement and the complete network configuration 1330. At 1340 GS-2 may enable stream to GS-1 over the new connection and at 1350 sync the device table containing all the devices that are currently connected with all devices. Note that this process is similar to the DORA (discover, offer, request and acknowledgement) process of a dynamic host configurable protocol (DHCP) server.

The flow chart of FIG. 14 shows an exemplary GS algorithm in relation to the group pairing. This algorithm may be started at 1410, by a group speaker application operating on a group speaker. At 1420 GS-1 may listen for commands on all of its interfaces (wired and wireless). After receiving a join command from the MCD, GS may request an IP address and network configuration from GS-1 at 1430. If the request fails at 1440 the status may be returned at 1460 and the process end at 1470. If the request succeeds then it may enable audio/video playback at 1450 and return the results to the MCD at 1460 and the process end at 1470.

MCD to MCD Initiated Group Pairing.

A master control device may initiate group pairing by sending a pairing request to another master control device. In order to initiate group pairing via another MCD a few criteria may be met. First, the MCD receiving the request should be a trusted device with sufficient privileges over the group it is associated with. Second, the MCD requesting the pairing should be a trusted device with sufficient privileges over any Group Speaker it attempts to move to the new group. Third, the MCD receiving the request may grant permission to the MCD requesting the group pairing. With reference to FIG. 15, If MCD-A 1510 has sufficient privileges over the 'John Home' group 1540, and MCD-B 1520 has sufficient privileges over the 'Sarah's Party' group 1550, then MCD-A 1510 may send a pairing request to MCD-B 1520 via the cloud 1530 to allow some or all of the speakers in the 'John Home' group 1540 to join the 'Sarah's Party' group 1550.

Note that this type of pairing may occur in different ways. For example, MCD-A may send a pairing request to MCD-B via the cloud 1530 (i.e. internet) depicted in FIG. 15. This may be termed "remote group pairing," and may allow groups to be synchronized regardless of location. In a different example, the groups may be within wireless range. Drawing on the example above, 'John Home' and 'Sarah's Party' groups may be required to be within wireless range. Instead of communicating via the cloud, MCD-A 1510 may send the pairing request to GS-A 1540, which may forward the request to GS-B 1550 through wireless connectivity of the speakers. GS-B 1550 may forward the request to MCD-B 1520. Once MCD-B 1520 grants permission, it may reply with the network configuration for any GS's in the 'John Home' group 1540 that will join the 'Sarah's Party' group 1550. Note that the flow in FIG. 15 may be performed by a group speaker application (GSA) operating on a group speaker.

GS to GS Initiated Group Pairing.

Group Speaker to Group Speaker initiated group pairing may follow the same conventions as MCD to GS Initiated Group Pairing, in that the GM may be responsible for providing network configuration. However, with GS to GS group pairing the MCD may not be actively involved in the pairing process. Instead, pairing may be initiated by a GS that is a current member of the group (such as GS-2 in FIG. 16) or by a GS that is external to the group (such as GS-3).

Figure 16:
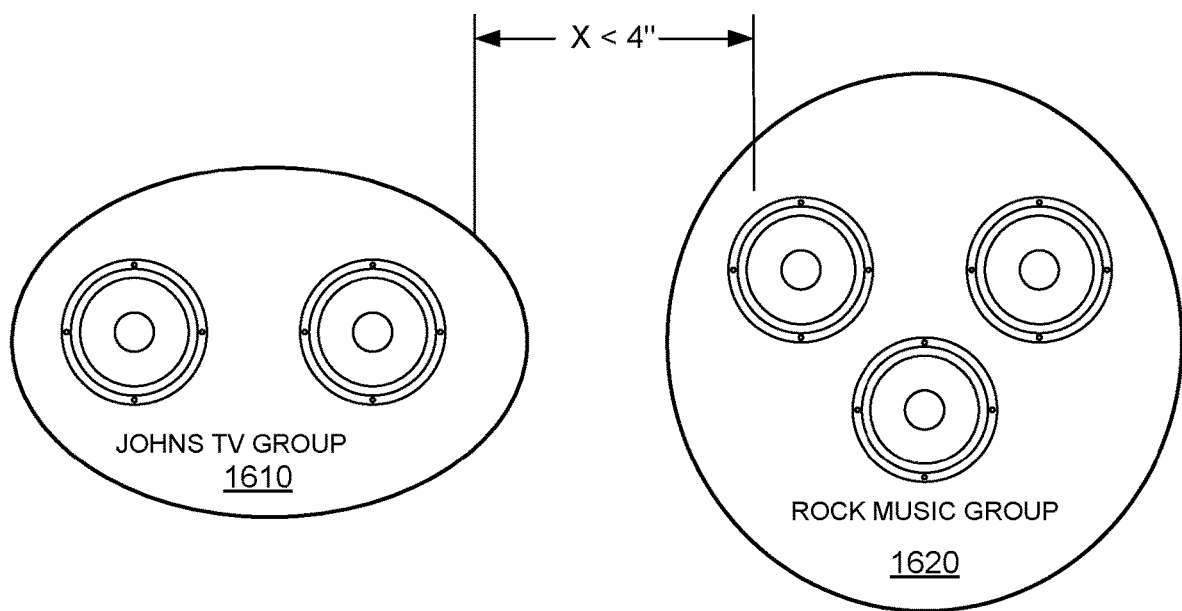
FIG. 16 illustrates exemplary GS to GS pairing, in accordance with some embodiments of the present invention.

Note that pairing behavior may be dependent on whether the GS's are configured in request pairing mode, host pairing mode or command pairing mode. Group speakers in request pairing mode may be configured to send a pairing request to a GS within wireless range, after the pairing button is pressed on the GS attempting to join a group. To illustrate, if the Group Speakers in FIG. 16 are in request pairing mode, GS-3 1620 may be placed within wireless range of GS-2 1611 and the pairing button is pressed on GS-3 1620, then GS-3 1620 may send a pairing request to GS-2 1611 to join the 'John's TV' group 1610.

Figure 17:
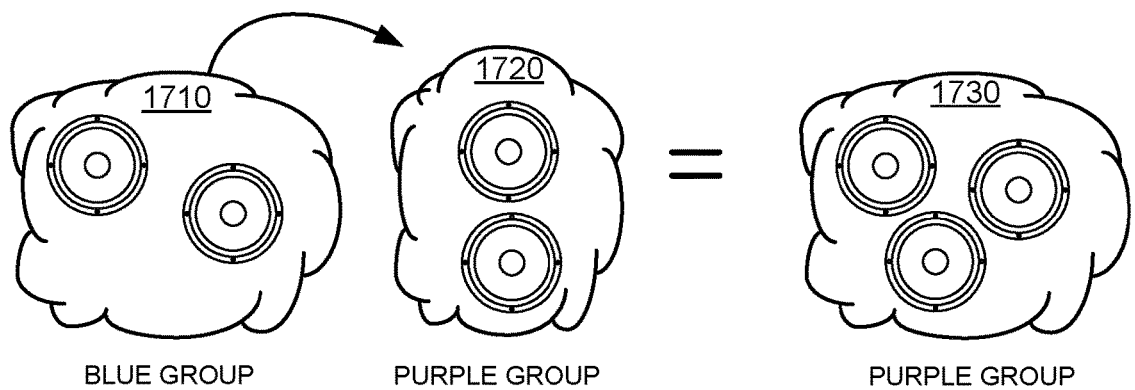
FIG. 17 illustrates exemplary GS to GS pairing, in accordance with some embodiments of the present invention.

Request pairing mode may transition a GS to and/or from groups using a group color method, as illustrated in FIG. 17. From an end-user perspective, a user may have to only press a button that toggles an LED color of the GS. In turn, the GS may autonomously transition to whatever color group is selected. In this manner, GS-3 may leave group 1710 to join GS-2 in group 1720, to form a new group 1730.

However, if the GS's are in host pairing mode and the pairing button is pressed on GS-3, then GS-3 may wait for a pairing request from GS-2 to join the 'Rock Music' group. Command pairing may produce the same results as host pairing (i.e. the external GS is brought to the group of the GS that the button was pressed on), but the methods of such pairing may be different. For example, instead of waiting on a request GS-3 may send a group pairing command to GS-2 along with the GM Information.

Some exemplary ways in which the different pairing modes affect GS to GS group pairing behavior is depicted below in Table 2. Note that the physical button press denoted in the table below may be replaced by a MCD command sent to the GS to initiate pairing.

TABLE 2

| Mode | Button Pressed On: | Result |
| --- | --- | --- |
| Request Pairing | GS-3 | GS-3 requests to join GS-2's 'John's TV' group |
| Request Pairing | GS-2 | GS-2 requests to join GS-3's 'Rock Music' group |
| Host Pairing | GS-3 | GS-3 waits for request from GS-2 to join 'Rock Music' group |
| Host Pairing | GS-2 | GS-2 waits for request from GS-3 to join 'Johns TV'group |
| Command Pairing | GS-3 | GS-3 commands GS-2 to join the 'Rock Music' group |
| Command Pairing | GS-2 | GS-2 commands GS-3 to join the 'John's TV' group |

Processes described above may apply to a GM in GS to GS initiated group pairing. However, the process for GS's may vary depending on whether or request pairing, host pairing mode, or command pairing is enabled. Exemplary processes for these circumstances are illustrated in FIGS. 18, 19, and 20, respectively.

As shown in FIG. 18, if the GS's are in request pairing mode, and the pairing button is pressed on a GS, then it may attempt to leave its current group for the group that is within wireless range. For one GS, the process may start at 1805, and at 1810 a pairing button on the GS may be pressed. At 1815 the GS may send a request to join a group via a wireless interface. This may be sent to a second GS, which may receive the request at 1850. At 1860 the second GS may send to the first GS information needed to join the group, which may be received by the first GS at 1820. Any errors may be handled at 1830, and may lead to termination of the process at 1840. At 125 the first GS may request network configuration from the GM, and if received and approved may be enabled for audio/video playback at 1835. The process may again terminate at 1840.

As shown in FIG. 19, if the GS's are in host pairing mode, and the pairing button is pressed on GS, then it may wait for a GS within wireless range to request to be added to the current group. It can be seen that the process in FIG. 19 is similar to FIG. 18, with only the perspective of the devices changed. With reference to FIG. 19, the process may start for a first GS at 1905, and again, a pairing button may be pressed at 1910. At 1915, the first GS may wait on an invitation to join the group, received from a second GS. For the second GS, the process may start at 1930, and at 1935 may send a request to join the group to the first GS, for example, via NFC communications. The first GS may receive this information and reply with GM at 1920 to the second GS, which may receive this communication at 1940. At 1950 any errors may be handled, resulting in termination of the process at 1925. At 1945 the second GS may request network configuration, and if received may be enabled for audio/video playback at 1955. Again, the process may terminate at 1925.

Figure 20:
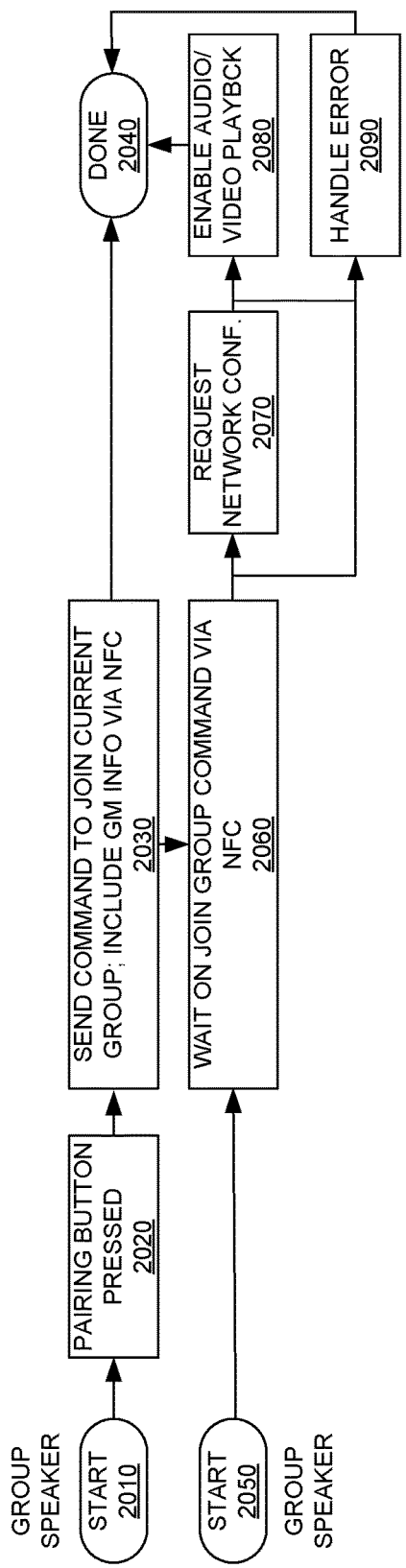
FIG. 20 illustrates an exemplary command pairing flow, in accordance with some embodiments of the present invention.

As shown in FIG. 20, if the GS's are in command pairing mode, and the pairing button is pressed on GS, then it may send a pairing command to join the current group to GS within wireless range (in accordance with some embodiments such as, but not limited to, NFC range). With reference to FIG. 20, the process may start for a first GS at 2010, and for a second GS at 2050. For the first GS, at 2020 a pairing button may be pressed, which at 2030 may send a command to join the current group to the second GS. This process subsequently may terminate for the first GS at 2040. The second GS may wait for and receive this command at 2060. Errors may be handled at 2090, which may cause termination of the process at 2040. Otherwise, at 2070 the second GS may request network configuration, and if properly received, be enabled for audio/video playback at 2080. Again, the process may terminate at 2040.

Group Merging.

In order to alleviate problems related to switching a large number GS's from one group to another, Group Speakers may be capable of group merging. As stated above, the addition of a Group Speaker to a group, is called group pairing. Group merging however, may be the addition of a group to a group. Rather than require a user to move multiple GS's from one group to another manually, Group Speakers may automate this process by either a batch GS switch or a group bridge. During a batch GS switch, a MCD or GS may send the command to join the new group to each speaker in the current group. This may occur two ways, either via a broadcast or multicast message to all group members at once, or a unicast message to each group member one by one as depicted in FIG. 21.

Figure 21:
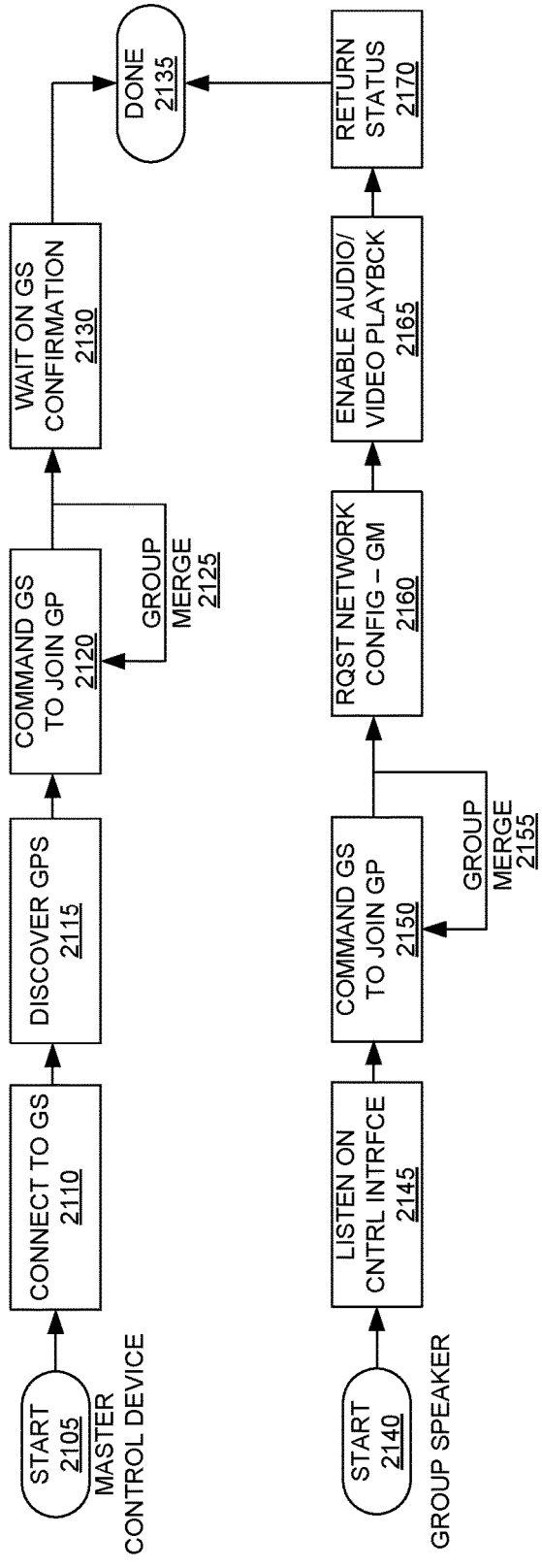
FIG. 21 illustrates an exemplary flow for MCD or GS in MCD to GS/MCD group merge, in accordance with some embodiments of the present invention.

With reference to FIG. 21, a process may begin for a MCD at 2105 and for a GS at 2140. The MCD may connect to the GS at 2110, discover groups at 2115, and command the GS to join identified groups at 2120. At 2125, the MCD may instruct a group merge. At 2130 the MCD may wait for confirmation that the GS properly joined the identified group, and the process may subsequently terminate at 2135. For the GS, after the process is started, the GS may listen on the control interface at 2145 for instructions from the MCD. At 2150 the GS may receive the command from the MCD to join a group, and may even receive a group merge command at 2155. At 2160 the GS may request network information from the GM, and if received may be enabled for audio/video playback at 2165. The GS may return the status of its connection to the MCD at 2170, and the process may subsequently terminate at 2135.

Figure 22:
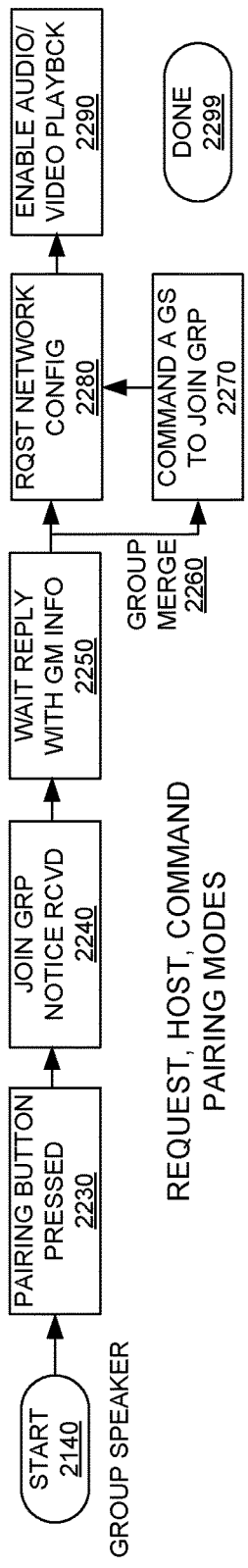
FIG. 22 illustrates an exemplary flow for GS in GS to GS group merge flow, in accordance with some embodiments of the present invention.

The flow chart in FIG. 22 highlights the batch GS switch program flow when the GS to GS pairing method is utilized. Starting at 2210, a pairing button on the GS may be pressed at 2230. At 2240 the GS may receive a notification or invitation to join a group, and at 2250 the GS may wait on reply from the GM with information needed to join. At 2260 a group merge may occur, and at 2270 a command may be received for another GS to join the group. At 2280 the GS may request network configuration information from the GM, which if properly received may enable audio/video playback at 2290 for the GS. The process may terminate at 2299.

Group Speakers may also support group merging via traditional network bridging. After a bridge is established between more than one group, it may become possible to share commands and media streams. This may be is useful because the group members themselves don't necessarily have to switch or update their network configuration. Instead, allowing commands and media streams to pass up and over the bridge may be the responsibility of the GM's as depicted in FIG. 23.

Figure 23:
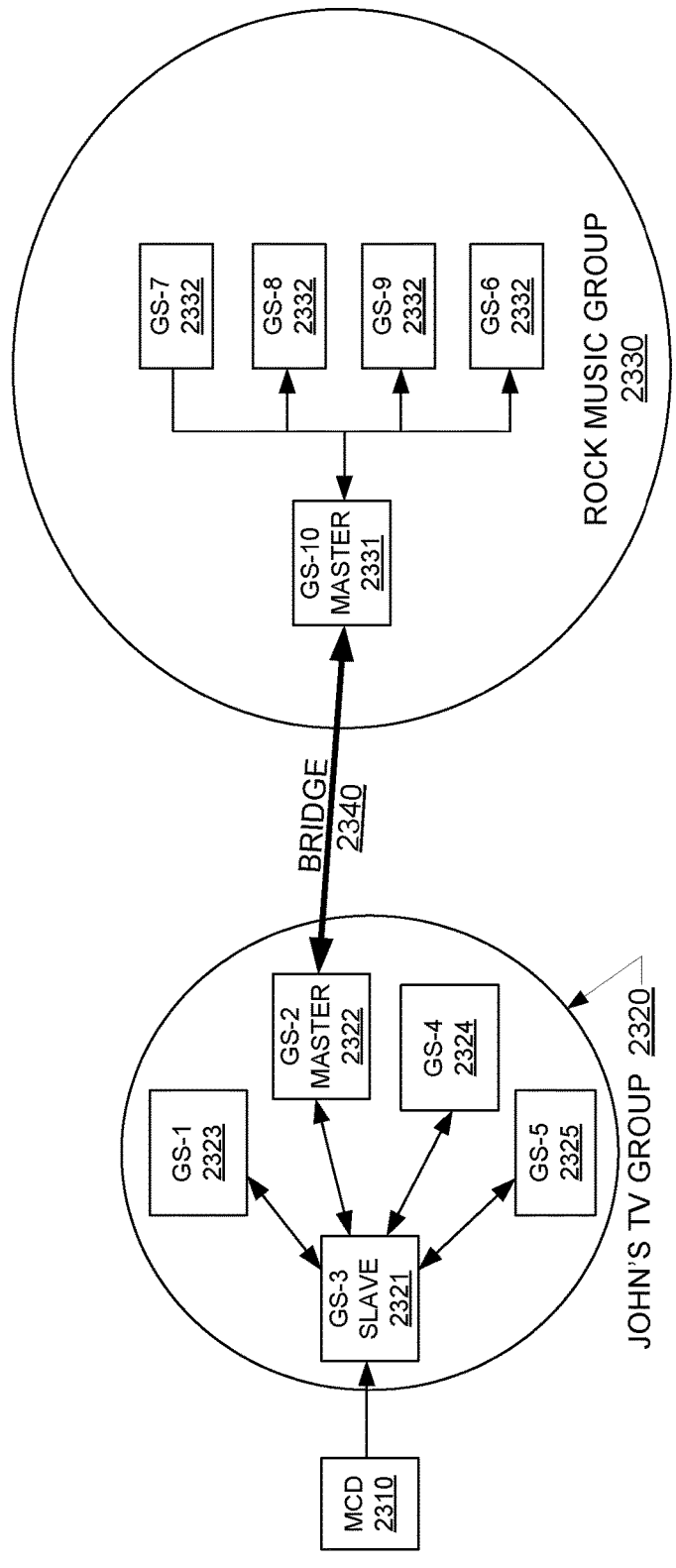
FIG. 23 illustrates an exemplary group merging via a network bridge, in accordance with some embodiments of the present invention.

With reference to FIG. 23, a MCD 2310 may be in communication with a GS 2321, which may be the streaming source. GS 2321 may be part of a group ("John's TV Group") 2320, which may include a master 2322 as well as other group speakers 2322, 2324, 2325. The master 2322 in John's TV Group 2320 may be connected to a master 2331 of a different group, shown as "Rock Music Group" 2330. Master 2331 may be part of a group also including group speakers 2332, 2333, 2334, 2335. By establishing a network bridge connection between master 2322 and master 2331, each speaker in group 2330 may receive the streaming source from GS 2321.

Group Speaker Streaming.

In accordance with some embodiments of the present invention, group Speakers may be generally configured to provide media streaming. A media stream may include, but is not limited to: audio, video or any other data that may be streamed and interpreted by a GS. FIG. 24 depicts several features of media streaming in accordance with some embodiments of the present invention. First a MCD 2410, 2430 may have the option to connect to and utilize the GM or any GS as the streaming host. Second the MCD may deliver the stream on any of the supported interfaces which includes but is not limited to Bluetooth, Wi-Fi, ZigBee, HDMI or USB. Third, the media stream may be delivered to the group members via what we call a media push. A push may be a multicast, unicast, or direct transmission of media data from the streaming host to the group members. Fourth, the media stream may be delivered to the group members via what we call a media pull. During a pull, the group members may remote mount storage on the media host and proceed to read the media stream as if it where local storage. During a media push or media pull the stream received from the MCD may be buffered (when possible) on the GS functioning as the media host.

With reference to FIG. 24, an MCD 2410 may be in communication with GS 2421, a slave GS in Group 2420 ("John's TV Group"). The feed from GS 2421 may be pushed to the master GS 2422, and each of the other GS 2423, 2424, 2425. MCD 2430 may be in communication with master GS 2441, which in turn may be in communication with multiple GS 2442, 2443, 2444, 2445. GS 2443 may be in communication with a remote storage 2446. Master GS 2441 may also be in communication with a remote storage 2447. MCD 2430 may pull media from these remote storages 2446, 2447 to provide to the group 2440 ("Rock Music Group").

Group Storage.

Figure 25:
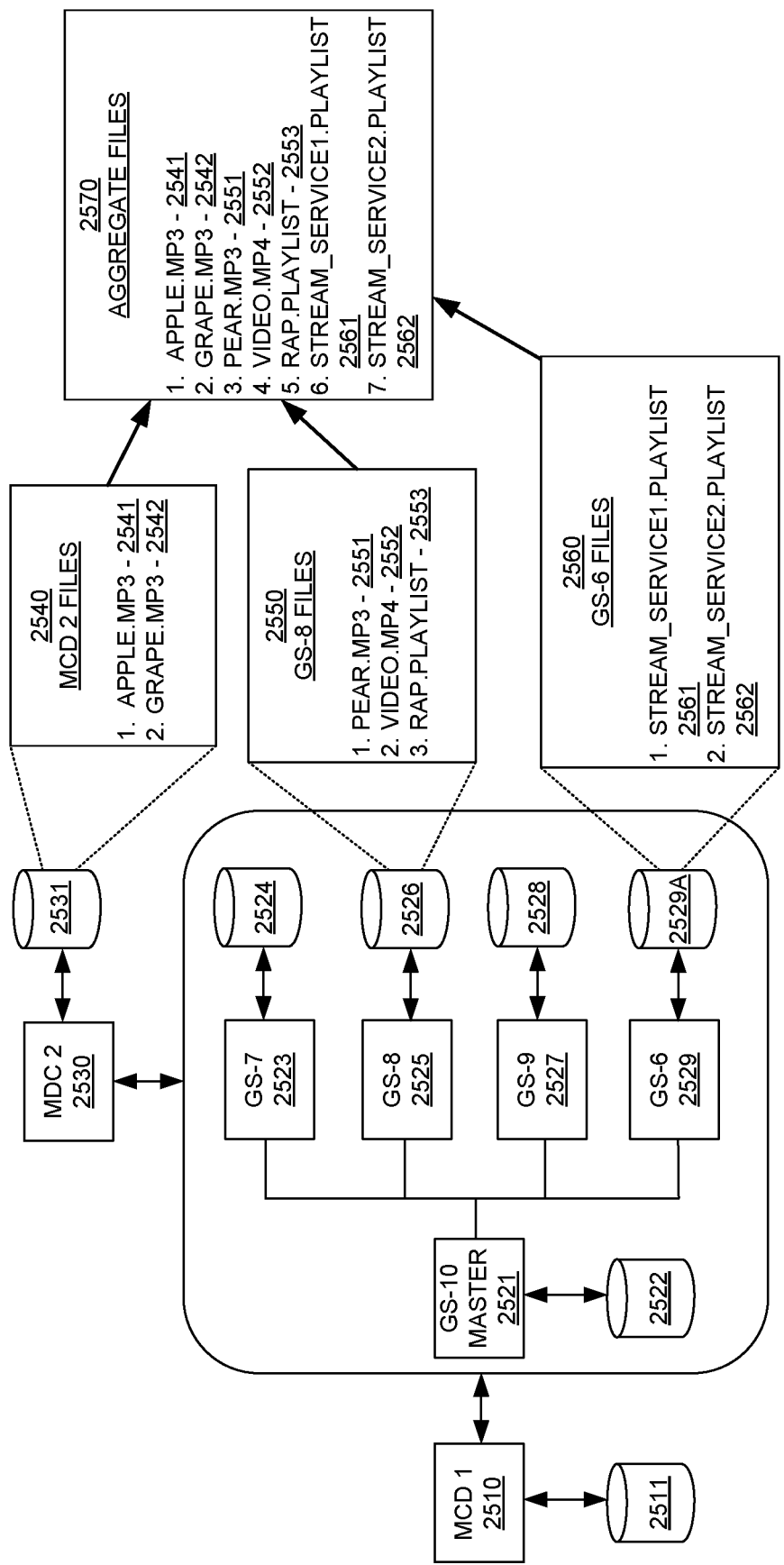
FIG. 25 illustrates an exemplary group storage, in accordance with some embodiments of the present invention.

Group speakers may be designed to allow flexibility in regards to users sharing control over the media stream. The group storage functionality may make it easier to share control and stream media because it may aggregate the storage of all devices connected to the group. The aggregated storage may be visible to all devices within the group including the MCD's. A MCD may select a media file for streaming to the group regardless if it is stored locally on the MCD or on a remote device like another MCD or Group Speaker. To illustrate, the 'Rock Music' group shown in FIG. 25 has three devices with media files stored locally, which are MCD 2 2530, GS-8 2525, and GS-6 2529. If the user connected to MCD 1 2510 (with a local storage 2511) wanted to stream media across the group 2520, it must first join the group 2520. Once the group 2520 is joined, MCD 1 2510 may be presented with the aggregate list 2570 of all of the media files available within the group. After the user selects a file for streaming (for example the pear.mp3 audio file), the command may be forwarded to the device that actually contains that media. In this example, pear.mp3 is stored in GS-8 2525 local storage 2526. GS-8 2525 may then begin to stream to the group in one of the two ways specified in the Group Speaker Streaming section. Although, this example describes the primary method, the pear.mp3 file could also have been copied to the current streaming source GS or MCD, and streamed from it. For example, if GS-10 2521 was the current streaming source and the user selected the pear.mp3 file located on GS-8 2525 local storage 2526, then the pear.mp3 file may be first copied to GS-10 2521 local storage or RAM 2522. After receiving the file, it can then begin streaming to the group.

In general, MCD 2510 may have a local storage or RAM 2511. MCD 2510 may join "Rock Music Group" 2520, which may comprise a master GS 2521 with local storage 2522, as well as other group speakers with local storage (GS 2523 with storage 2524, GS 2525 with storage 2526, GS 2527 with storage 2528, and GS 2529 with storage 2529A). Some of these local storages may include files. For example, storage 2526 may comprise files 2551, 2552, and 2553. Storage 2529A may comprise files 2561, 2562.

In addition to the group speakers, the group may also comprise other MCDs with storage. For example, MCD2530 may have local storage 2531 with files 2541, 2542. The group 2520 may maintain a list of all aggregate files across the group 2570 (that includes 2541, 2542, 2551, 2552, 2553, 2561, 2562) that may be accessed by any GS or MCD in the group 2520.

Network Security.

As stated above, a group may operate in public or private mode, and command and control may be reserved for trusted devices only. A device may be considered a trusted device through a variety of methods contemplated by the present invention. For example, a device may be deemed a trusted device by placing the MCD in close proximity to the GS and allow the devices to transmit and receive data over a Near Field Communication (NFC) connection. This process may allow the MCD and GS to exchange public/private keys, such as but not limited to a RSA key or similar key. Such keys may then used to authenticate future connections between MCD's and GS's. Alternatively, the MCD may be paired with the GS via either Bluetooth or Wi-Fi direct and exchange public/private keys. Message signing and key based authentication is well known, and various methods of message signing and/or key based authentication may be utilized by the present invention without deviating from the scope of the present invention.

Group Auto Configuration and Repair.

Group speakers are generally portable and may not require an external wireless access point (AP) to function. Instead, each GS may have the ability to function as an AP itself. Although this solves the portable group problem, it may introduce connection issues if the GM (i.e. access point) is lost because the GM was powered down, switched to another group, or became otherwise unavailable. Upon such occurrence, devices communicating on the group network may become connectionless and streaming will be impossible. In order to alleviate this problem GS's may support a feature termed auto configuration and repair ACR. In short, ACR may comprise a suite of algorithms that may allow a group to automatically select a group member to function as the new GM if the previous GM becomes unavailable. Once the group member becomes the GM, it may re-establish connections with the remaining group members (i.e. MCD's and GS's). FIG. 26 provides an exemplary high-level depiction of this potential problem and solution.

With reference to FIG. 26, the 'John's TV' group initial state 2610 has five (5) Group Speakers (2611, 2612, 2613, 2614, 2615) where GS-2 2611 is the master and all network connections are fully functional. Later at state 2620, GS-2 2621 may be powered off and as a result the GM is lost. Thus, the second state 2620 has four (4) group speakers (2622, 2623, 2624, 2625) with no GM and the group network is completely down. The remaining GS may execute their respective ACR algorithms and at state 2630 GS-3 2633 may become the new GM and corresponding access point for the 'John's TV' Group'. This may allow the remaining GS (2632, 2634, 2635) to restore their lost network connections. The final state 2630 has four (4) Group Speakers where GS-3 2633 is the GM and all network connections are fully functional.

Group Lists.

The group list may be an instrumental component of the ACR process. The group master may maintain a list of all GS's and MCD's connected to the group. After a device joins or leaves the group the GM may update the group list and provide or synchronize the same with each group member. In other words, each device belonging to the group may have a copy of the group list that it receives from the GM. With reference to FIG. 21, in state 1 of 'John's TV' group 2610, the GM is GS-2 2611 and it contains the primary group list which has the following devices listed: GS-1 2612, GS-3 2613, GS-4 2614, GS-5 2615 and group master GS-2 2611. Note that each GS may also have a backup copy of the primary group list. If the group master GS-2 2611 becomes unavailable for any reason, then the group may enter into state 2 2620, start the ACR process, and use the group list to determine the next speaker slated to become the group master. At that point GS-3 2623 may become the group master by turning into an access point and broadcasting its SSID to allow connections. Finally, the group members may connect to the new GM, effectively restoring the group to state 3 2630. However, if the first attempt failed, then this process may continue until there are no nodes available to become the new GM.

Group Repeater.

Since the access point may be mobile, there may be times when signal strength may be degraded depending on the distance a GS is from the GM. Accordingly, the ACR suite of algorithms may comprise a feature that allows any speaker to turn itself into a wireless repeater. In the simplest example, a GS may determine is proximity to other GS's as well as the GM, and automatically decide (based upon various criteria) whether it should become a repeater. If it does then after notifying the GM it will begin repeating the master signal. Note that repeater functionality is not limited to the network build by GS. Instead, a GS may be used to repeat external wireless networks in range, thereby potentially alleviating the need for external wireless extender devices.

Hardware.

The core of a Group Speaker may be the Speaker Management Controller (SMC). One function of the SMC may be to configure and control hardware and software related to group speaker functionality, including but not limited to group pairing, remote pairing, media streaming, sensor reading, LED control, volume control, power control, security, media streaming, media storage, video output, and audio output. Master control devices may communicate with the SMC via the control interfaces depicted in FIG. 27.

For example, exemplary FIG. 27 shows an SMC 2710 that may comprise, in general a control interface 2711, which in turn may comprise Wifi connections, BT connections, and/or USB connections, along with NFC 2715 readers/interrogators/tags. SMC 2710 may also comprise an HDMI output 2716 for a display 2717 (which may optionally be included for devices with video components). A digital signal processor (DSP) 2718 may be connected to the SMC 2710, which may also receive inputs from a microphone 2722, potentially through an analog-digital converter (ADC) 2721. The DSP 2718 may output a signal to an analog or digital input device, such as but not limited to amp 2719, which in turn may output the signal to an attached speaker 2720.

The SMC 2710 may further comprise flash storage (or other local storage or data store) 2730, as well as a power supply system 2740 comprising a battery 2741 and AC to DC converter unit (ADCU) 2742. The SMC 2710 may also comprise one or more sensors 2720, which may include, but are not limited to, an accelerometer 2731, a proximity sensor 2732, a magnetic field sensor 2733, a light sensor 2734, and/or a global positioning system/sensor 2735.

Control Interfaces.

The control interfaces of the SMC may facilitate communication between a Group Speaker and MCD. Control interfaces may support control commands, group pairing and media streaming. The Wi-Fi interface may provide means by which the group master may acts as a wireless access point, broadcasts its SSID, and accepts or rejects group pairing connection attempts. Note that in according to some embodiments of the present invention, the Wi-Fi interface may only support physical authentication when Wi-Fi Direct is enabled. In contrast, other communication protocols such as, but not limited to, the Bluetooth, USB and NFC interfaces may generally support physical authentication. In accordance with some embodiments of the present invention, NFC may provide GS to GS pairing.

Audio Output.

The audio subsystem (as it relates to the speakers playing sound) may be thought of as having two types of devices, input and output. Input devices may have two types: digital and analog. The input devices that provide a digital audio stream to the SMC may be Wi-Fi, BT, USB, and HDMI. Analog signals may come from connectors such as but not limited to, XLR, 3.5 mm jacks, and/or RCA interfaces. The output devices may be the ADC, DSP, AMP, speaker, and/or any other device that is desirable or necessary to output an analog or digital signal. These devices may be connected together and are responsible for the audible sound that comes out of the GS.

Sensors.

In accordance with some embodiments of the present invention, and as briefly noted above with regard to FIG. 27, Group Speakers may comprise sensors that may allow add additional capabilities. For example, an accelerometer may be used to determine the speed of the device when carried by a user, and when used in tandem with a global positioning (GPS) system may track the distance traveled and approximate arrival time to a location. A GPS may be used to provide a user with their current longitude and latitude at any given point in time. A magnetic field sensor may provide a user the ability to use the GS as a compass. A proximity sensor may be used to detect when a user is within range and may trigger an auto power on sequence or illuminate the LEDs. A light sensor may be used to illuminate the buttons and LED's in low light situations. A microphone may be used for phone calls and or voice control, or as analog streaming source. Each of these are some exemplary sensors that may be used in conjunction with Group Speakers. Additional and different sensors may also be used to provide different user features.

It is notable that the group speaker functionality may be facilitated by a combination of hardware and software working in tandem. Without the software, specific speaker hardware, and networking capabilities, most if not all of the group speaker functionality would not be possible. The master control application (MCA) may run on multiple types of master control devices (MCD's), such as but not limited to smart phones, mobile computing devices, tablet computers, personal computers, and/or even servers. The group speaker application (GSA) may be firmware that may run exclusively on the group speakers and may be responsible for all group speaker functionality, including but not limited to hardware control, media streaming, group pairing, group algorithms, configuration, etc.

For example, the MCA may be operating on a MCD, and a GSA may be running on one or more group speakers. Communication from the MCA to the GSA may be facilitated by the MCD hardware and the group speaker hardware via a network connection. Each of the aspects discussed above—including but not limited to group pairing, group speaker streaming, group storage, network security, and/or group auto configuration and repair—may be the result the application (the MCA) on the MCD interacting and communicating with the group speakers via the group speaker application, in order to achieve the discussed functionality.

Again, in this manner various users of Group Speakers can leverage the technology as discussed above to augment social media and provide additional connections to various people—celebrity and otherwise—to provide shared experiences.

The applications for group speakers in accordance with some embodiments of the present invention are numerous. For example, it is contemplated that zoning may be supported—and accordingly, a single disc jockey (DJ) may play one type of music in one room or area (for example, rap), and a different type of music in a different room or area (for example, house music). Moreover, multiple inputs may be supported (for example, the music and a microphone)

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A system for broadcasting and sharing wireless data, the system comprising:
   a plurality of wireless playback devices, each acting as an individual node in a specific wireless network, each wireless playback device configured to:
   access the specific wireless network; and
   audibly output audio and/or video data received over the specific wireless network;
   one of the plurality of wireless playback devices being a group master, the group master being a network source for the plurality of wireless playback devices and determining the specific wireless network upon which it transmits audio and/or video data to other wireless playback devices, and being the source of the audio and/or video data transmitted to each wireless playback device;
   wherein each wireless playback device enables communication between devices on the specific wireless network, such that the source of the audio and/or video data for a playback device may be any of the devices on the specific wireless network.

2. The system for broadcasting and sharing wireless data of claim 1, wherein the plurality of wireless playback devices may be configured to join different wireless networks other than the specific wireless network.

3. The system for broadcasting and sharing wireless data of claim 2, wherein each group may be formed of one or more wireless playback devices, and wherein audio and/or video data may be shared across each group.

4. The system for broadcasting and sharing wireless data of claim 1, wherein the group master is a designated wireless playback device.

5. The system for broadcasting and sharing wireless data of claim 1, wherein the group master is a mobile telephone, smart phone, computer, laptop computer, tablet, television, or appliance.

6. The system for broadcasting and sharing wireless data of claim 1, wherein if group master is powered off or removed from the group, any of the wireless playback devices on the specific wireless network can become group master.

7. The system for broadcasting and sharing wireless data of claim 1, further comprising a master control device, the master control device configured to send data to the group master for distribution to the wireless playback devices.

8. The system for broadcasting and sharing wireless data of claim 1, wherein the master control device is a computing device configured to manipulate and/or combine audio signals.

9. The system for broadcasting and sharing wireless data of claim 7, wherein the master control device sends data to the group master over a cabled connection.

* * * * *